US011430153B2

(12) United States Patent
Syed (10) Patent No.: US 11,430,153 B2
(45) Date of Patent: Aug. 30, 2022

(54) METHOD FOR DETECTING AN ARRANGEMENT OF AT LEAST TWO CAMERAS OF A MULTI-CAMERA SYSTEM OF A MOBILE CARRIER PLATFORM RELATIVE TO ONE ANOTHER AND METHOD FOR DETECTING AN ARRANGEMENT OF THE CAMERA WITH RESPECT TO AN OBJECT OUTSIDE THE MOBILE CARRIER PLATFORM

(71) Applicant: Robert Bosch GmbH, Stuttgart (DE)

(72) Inventor: Azaruddin Syed, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 17/046,544

(22) PCT Filed: Apr. 15, 2019

(86) PCT No.: PCT/EP2019/059611
§ 371 (c)(1),
(2) Date: Oct. 9, 2020

(87) PCT Pub. No.: WO2019/206699
PCT Pub. Date: Oct. 31, 2019

(65) Prior Publication Data
US 2021/0035328 A1 Feb. 4, 2021

(30) Foreign Application Priority Data
Apr. 23, 2018 (DE) .......................... 102018206190.4

(51) Int. Cl.
*G06T 7/80* (2017.01)
*B60R 1/00* (2022.01)

(52) U.S. Cl.
CPC .................. *G06T 7/80* (2017.01); *B60R 1/00* (2013.01); *B60R 2300/102* (2013.01);
(Continued)

(58) Field of Classification Search
CPC ................ B60R 1/00; B60R 2300/102; B60R 2300/105; G06T 2207/30204;
(Continued)

(56) References Cited

U.S. PATENT DOCUMENTS

2008/0231710 A1 9/2008 Asari et al.
2016/0275683 A1* 9/2016 Sakano .................... B60R 1/00
(Continued)

FOREIGN PATENT DOCUMENTS

| DE | 112013004851 T5 | 6/2015 |
| EP | 3076654 A1 | 10/2016 |
| WO | 2018000039 A1 | 1/2018 |

OTHER PUBLICATIONS

International Search Report for PCT/EP2019/059611, dated Jun. 11, 2019.

*Primary Examiner* — Farzana Hossain
(74) *Attorney, Agent, or Firm* — Norton Rose Fulbright US LLP; Gerard Messina (57) ABSTRACT

A method for detecting an arrangement of cameras of a multi-camera system of a mobile carrier platform with respect to one another. The method includes reading in first and second image signals, the first image signals representing an image of a marker pattern and a first camera parameter from a first camera and the second image signals representing an image of a marker pattern and a second camera parameter from a second camera, the first and second cameras being oriented in different viewing directions, the viewing areas of the first and second camera at least partially overlapping. The method further includes extracting a first arrangement parameter of the first camera using the read-in first image signal and/or extracting a second arrangement parameter of the second camera using the read-in second image signal, and also calculating a differential arrangement
(Continued)

parameter of the second camera in relation to the first camera.

20 Claims, 6 Drawing Sheets

(52) U.S. Cl.
CPC .............. *B60R 2300/105* (2013.01); *G06T 2207/30204* (2013.01); *G06T 2207/30252* (2013.01)

(58) Field of Classification Search
CPC . G06T 2207/30244; G06T 2207/30252; G06T 7/73; G06T 7/80; G06T 2207/10056; G02B 21/006; G02B 21/0072; G02B 21/008; G02B 21/16; G02B 21/244; G02B 21/367; G06V 20/69; H04N 5/23212; H04N 9/04
See application file for complete search history.

(56) References Cited

U.S. PATENT DOCUMENTS

| | | |
|---|---|---|
| 2016/0343136 A1 | 11/2016 | Heidi et al. |
| 2019/0028632 A1* | 1/2019 | Nobori ............... G06K 9/00805 |

* cited by examiner

METHOD FOR DETECTING AN ARRANGEMENT OF AT LEAST TWO CAMERAS OF A MULTI-CAMERA SYSTEM OF A MOBILE CARRIER PLATFORM RELATIVE TO ONE ANOTHER AND METHOD FOR DETECTING AN ARRANGEMENT OF THE CAMERA WITH RESPECT TO AN OBJECT OUTSIDE THE MOBILE CARRIER PLATFORM

FIELD

The present invention is directed to a device and method for detecting an arrangement of at least two cameras of a multi-camera system of a mobile carrier platform. The present invention also relates to a computer program.

BACKGROUND INFORMATION

Multi-camera systems, in particular, surround view camera systems for vehicles, should be calibrated in order to obtain a preferably high degree of precision of the data supplied by these camera systems.

SUMMARY

A method for detecting an arrangement of at least two cameras of a multi-camera system of a mobile carrier platform with respect to one another, a method for detecting an arrangement of the camera with respect to an object outside the mobile carrier platform, further a device that uses this method, and a corresponding computer program are provided in accordance with the present invention. Advantageous refinements of and improvements on the device, methods, and computer programs, are described herein.

A method in accordance with an example embodiment of the present invention is based on the arrangement or identification of known two-dimensional marker pattern structures in the surroundings of a multi-camera system of a mobile carrier platform, in order to detect an arrangement of at least two cameras of the multi-camera system with respect to one another and in order to thereby obtain a relative camera position of the first camera in relation to the second camera. An arrangement of the first camera of the multi-camera system with respect to an object outside the mobile carrier platform may thereby also be detected in order to obtain a camera position of the first camera in relation to the object.

In accordance with an example embodiment of the present invention, a method is provided for detecting an arrangement of at least two cameras of a multi-camera system of a mobile carrier platform with respect to one another, the method including the following steps:

reading in at least first image signals and second image signals, the first image signals representing at least one image of a marker pattern and a first camera parameter from a first camera, and the second image signals representing at least one image of a marker pattern and a second camera parameter from a second camera, the second camera being oriented in a viewing direction differing from the first camera, the viewing areas of the first and second camera at least partially overlapping, a marker carrying the marker pattern being read in as situated in a section of the viewing area of the first and second cameras;

extracting a first arrangement parameter of the first camera using the read-in first image signal and/or a second arrangement parameter of the second camera using the read-in second image signal, in particular, of the first arrangement parameter of the first camera and/or of the second arrangement parameter of the second camera using the read-in first and second image signals, the first and the second arrangement parameter representing a position and/or an orientation of the first and second camera in relation to the marker; and calculating a differential arrangement parameter of the second camera in relation to the first camera using the extracted first and/or second arrangement parameter in order to obtain a relative camera position of the second camera in relation to the first camera.

A camera may be a photo-technical apparatus, which is able to record or convey via an interface static or moving images on a photographic film or electronically on a magnetic video tape or digital memory medium. The camera may, in particular, be a camera of a surround view camera system for a vehicle, the camera being situated at a vehicle and being designed to continuously record and provide pieces of information or images of the vehicle surroundings. A multi-camera system may be a network made up of a plurality of cameras, in particular, wide-angle cameras. Multi-camera systems are used, for example, as an application in the automotive sector, the cameras of the multi-camera system having, for example, differing viewing areas. In this case, the images of differing viewing areas of the vehicle surroundings recorded by the cameras may be merged to form a 360-degree view, in order to assist the vehicle driver with difficult driving maneuvers, for example, in narrow spaces. A mobile carrier platform may, for example, be a vehicle for transporting persons or goods, a work machine such as, for example, an excavator or an agricultural tractor. A camera parameter may, for example, be a so-called internal or intrinsic parameter of a camera. An internal parameter in this case may be understood to mean the internal geometry of the camera, for example, a focal length of the camera, a distortion or the like. A marker pattern may, for example, be a previously known and two-dimensional structure, which maps a checkerboard pattern or else a pattern having (for example, symmetrically arranged) circles and may be situated on a marker. A marker may, for example, be a sign or another object for visual marking for detecting an arrangement of at least two cameras of a multi-camera system of a mobile carrier platform and/or for detecting an arrangement of the camera of a multi-camera system and with respect to an object outside the mobile carrier platform. A differential arrangement parameter may, for example, be understood to mean a vector of the distance or the angle orientation between the first and second camera, a respective orientation or the respective positions of the first and second camera. This makes it possible to identify the positions or the geographical arrangement of the first and second camera on the mobile carrier platform with respect to one another, so that this information is not required to be provided by a manufacturer of the mobile carrier platform. The approach presented herein may have a significant advantages over the related art, in particular, in terms of retrofitting or readjustment, since the ascertainment of the arrangement or of the orientation of the first and second camera with the aid of a technically easily implementable approach is afforded.

There is a growing demand for multi-camera systems, for example, surround view camera systems, for vehicles. These surround view camera systems serve the driver as a visual aid by supplying information about the vehicle surroundings. This information about the vehicle surroundings of the vehicle is useful, in particular, in those cases in which the vehicle is maneuvered in narrow and/or closed spaces, or if particular areas of the vehicle surroundings are not in the direct line of sight of the driver due to a particular vehicle type and/or different vehicle dimensions resulting therefrom such as, for example, in the case of earth-moving machines.

The advantages of the method approach presented herein are found, in particular, in the fact that no complicated and expensive structures are required for detecting an arrangement of at least two cameras of a multi-camera system of a mobile carrier platform, for example, of a vehicle and/or for detecting an arrangement of a camera of a multi-camera system with respect to an object outside the mobile carrier platform, for example, of a vehicle. The present approach merely requires at least one marker pattern-carrying marker, which is situated in the visual surroundings of the mobile carrier platform, for example, of a vehicle, in order to carry out a detection of an arrangement of at least two cameras with respect to one another or of the camera with respect to an object outside the mobile carrier platform, in order to obtain the individual positions of the cameras of the multi-camera system.

In the method in accordance with an example embodiment of the present invention described herein, multiple markers may, for example, also be situated in the overlapping viewing areas of at least two cameras of a multi-camera system situated adjacent to one another in order to carry out a detection. There are no limitations in this case as to the arrangement of the at least one marker and/or of the markers relative to one another or in relation to the mobile carrier platform, other than that these markers should be clearly recognizable by the cameras. This fact makes it simple and saves time in order to carry out the method approach, in particular, in the case of a large number of cameras, or in the case of time restrictions and/or space restrictions, for example, during the production operation. Since it is an approach that is easy to carry out, no expert knowledge is required from a technician for carrying out the method.

According to one specific embodiment of the present invention, a third camera may read in at least third image signals in the step of reading in, which represent at least one image of a marker pattern of a second marker and a third camera parameter, the third camera being oriented in a viewing direction differing from the first and/or from the second camera, the viewing areas of the first, second and/or third camera at least partially overlapping, a second marker being read in as situated in a section of the viewing area of the first and third and/or of the second and third camera, a third arrangement parameter of the third camera being extracted in the step of extracting using the third image signals, the differential arrangement parameter of the third camera being calculated in the step of calculating in relation to the second and/or first camera using the extracted third arrangement parameter, in order to obtain a relative camera position of the third camera in relation to the second and/or to the first camera. Such a specific embodiment of the approach presented herein yields the advantage that the cameras of a multi-camera system may be situated at any arbitrary position at the vehicle, provided there is a sufficient overlap of the viewing areas between the cameras situated adjacent to one another, i.e., between the first and third and/or between the second and third camera. In this case, a distortion in an overlapping viewing area of the first, second and/or third camera should be low enough so as to be able to carry out a successful detection of the arrangement of at least two cameras of the multi-camera system with respect to one another. It is also possible that in this specific embodiment, the same marker is used as in a specific embodiment of the method 1 presented herein. For this purpose, a spatial position of the marker may be changed after the steps of a specific embodiment of the method presented herein are carried out. In the method approach presented herein, it is also possible to use merely one marker, as long as the image is recorded without changing the camera position and/or camera orientation.

According to one specific embodiment of the present invention, the first and second markers may be read in in the step of reading in on the same side or on sides situated adjacent to one another or on opposite sides of the mobile carrier platform. Such a specific embodiment of the approach presented herein yields the advantage that a first and a second camera of a multi-camera system observe the same marker or the same marker pattern from different viewing angles, as a result of which a calculation of the camera position of the first camera in relation to the second camera is possible.

According to one specific embodiment of the present invention, the first and/or second image signals may be read in in the step of reading in from a first and/or second wide-angle camera having a field of view of at least 130 degrees, in particular, at least 170 degrees. Such a specific embodiment of the approach presented herein yields the advantage that wide-angle cameras are able to provide a particular display of a spatial depth of the vehicle surroundings and that, furthermore, every viewing area of the vehicle surroundings, for example, in front of the vehicle, behind the vehicle and to the left and right of the vehicle, is covered by using at least four cameras in a multi-camera system, and thus resulting in a 360 all-around view for the driver of the vehicle.

According to one specific embodiment of the present invention, the step of extracting may take place using a previously known marker pattern structure, the marker pattern structure mapping, in particular, a checkerboard pattern and/or a pattern having arranged circles and/or a two-dimensional pattern. Such a specific embodiment of the approach presented herein yields the advantage that, for example, a checkerboard pattern represents a geometrically simple, binary pattern having alternating black and white squares, this pattern being rotationally invariant and thus clearly identifiable. In this case, already one marker pattern is sufficient, in principle, in order to carry out the approach presented herein, time being able to be saved when using multiple marker patterns by reducing steps in the recording of data.

In accordance with an example embodiment of the present invention, a method is provided for detecting an arrangement of the camera with respect to an object outside the mobile carrier platform, the method including the following steps:

reading in object image signals, the object image signals representing at least one image of an object marker pattern and of a camera parameter from the first camera; and determining an object arrangement parameter of the first camera with respect to the object marker using the read-in object image signals and the first camera parameter, the object arrangement parameter representing a position and/or orientation of the first camera in relation to the object marker in order to obtain a camera position of the first camera in relation to the object marker.

The object marker may be a marker having a marker pattern. The marker used in the method for detecting an arrangement of at least two cameras of a multi-camera system may, in particular, also be used in the method for detecting an arrangement of the camera with respect to an object outside the mobile carrier platform.

According to one specific embodiment of the present invention, the method may provide a step of providing a reference arrangement parameter between a first reference point in a viewing area of the first camera and a second reference point and a step of determining the camera position of at least the first camera in relation to the second reference point using the provided reference arrangement parameter. The first reference point may be a color-coded or merely virtual point on or at an object. The first reference point is situated preferably at a marker in a viewing area of the first camera. The first reference point may, for example, be a point on a marker pattern of a marker. The second reference point is situated preferably at or on or in the mobile carrier platform. The second reference point may, for example, be a point centered in or in the center of an axle, in particular, of a vehicle axle of the mobile carrier platform. A reference arrangement parameter between the first and the second reference point may be understood to mean a spatial orientation of the reference points relative to one another, i.e., a relative position and a distance with respect to one another, for example, in a coordinate system having the coordinate origin in the second reference point. The provision of the reference arrangement parameter may provide an ascertainment of the spatial distance or of the relative orientation of the reference points with respect to one another using a suitable distance-detecting detection device. The relative orientation of the reference point is preferably ascertained with the aid of a rangefinder or of a measuring tape. It is particularly preferred if the reference points, in particular the first camera, are situated along an imaginary line. It is also advantageous if an axis of symmetry of the marker is oriented in parallel to an axis of symmetry of the mobile carrier platform. This simplifies the ascertainment of the relative orientation of the reference point and the ascertainment of the camera position with respect to the first reference point.

The determination of the camera position of at least the first camera in relation to the second reference point using the provided reference arrangement parameter corresponds to a coordinate change of a coordinate system having a coordinate origin at the position of the first camera with respect to a coordinate system having a coordinate origin at the position of the second reference point. A transformation or a switch of the coordinate system to a coordinate system having an arbitrary predefinable coordinate origin is possible with the method described herein. As a result, an exact knowledge of the spatial positions of the cameras at the mobile carrier platform is not necessary.

According to one specific embodiment of the present invention, the method for detecting an arrangement of the camera with respect to an object outside the mobile carrier platform may include a step of ascertaining a further object arrangement parameter of a second camera with respect to the object marker using a differential arrangement parameter and arrangement parameter of the first camera, the further object arrangement parameter representing a position and/or orientation of the second camera in relation to the object marker, in order to obtain a camera position of the second camera in relation to the object marker. Such a specific embodiment of the approach presented herein yields the advantage that by knowing a camera position of the first camera in relation to the object marker, by knowing a camera position of the second camera in relation to the object marker and by knowing a relative camera position of the second camera in relation to the first camera, it is possible, for example, to carry out a calibration of the multi-camera system and to readjust the multi-camera system.

According to one specific embodiment of the present invention, a pattern may be read in as an object marker pattern in the step of reading in, which corresponds to the marker pattern. Such a specific embodiment of the approach presented herein yields the advantage that already one marker pattern is sufficient in order to successfully carry out the method approach presented herein.

According to one specific embodiment of the present invention, object image signals may be read in in the step of reading in, in which an axis of the object marker pattern is oriented to a visual axis of the first camera, which has a lower distortion than a further visual axis of another viewing area of the first camera. Such a specific embodiment of the approach presented herein yields the advantage that the read-in object image signals are processed in order to determine an offset or a shift between image patterns or an offset or a shift between reference points of the object marker and reference points of the multi-camera system, in order to thereby obtain a camera position of the first camera in relation to the object marker or to one of the reference points.

One or multiple of the methods presented herein may, for example, be implemented in software or in hardware or in a mixed form of software and hardware, for example, in a device or in a control unit.

The present invention further provides a device, which is designed to carry out, activate or implement the steps of a variant of a method provided herein in corresponding units. With this embodiment variant of the present invention in the form of a device as well, it is possible to quickly and efficiently achieve the object underlying the present invention.

For this purpose, the control unit may include at least one processing unit for processing signals or data, at least one memory unit for storing signals or data, at least one interface to a sensor or to an actuator for reading in sensor signals from the sensor or for outputting data signals or control signals to the actuator and/or at least one communication interface for reading in or outputting data, which are embedded in a communication protocol. The processing unit may, for example, be a signal processor, a microcontroller or the like, the memory unit capable of being a flash memory, an EEPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A device in the present case may be understood to mean an electrical device that processes sensor signals and, as a function thereof, outputs control signals and/or data signals. The device may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made at least partly of discrete components. In a software design, the interfaces may be software modules, which are present, for example, on a microcontroller alongside other software modules.

Also advantageous is a computer program product or computer program having program code, which may be stored on a machine-readable medium or memory medium, such as a semiconductor memory, a hard disk memory or an optical memory, and which is used for carrying out, implementing and/or activating the steps of the method according to one of the previously described specific embodiments, in particular, when the program product or program is executed on a computer or on a device.

BRIEF DESCRIPTION OF THE DRAWINGS

Exemplary embodiments of the present invention are depicted in the figures and explained in greater detail below.

DETAILED DESCRIPTION OF EXAMPLE EMBODIMENTS

In the description below of preferred exemplary embodiments of the present invention, identical or similar reference numerals are used for elements which are represented in the various figures and act similarly, a repeated description of these elements being omitted.

Figure 1:
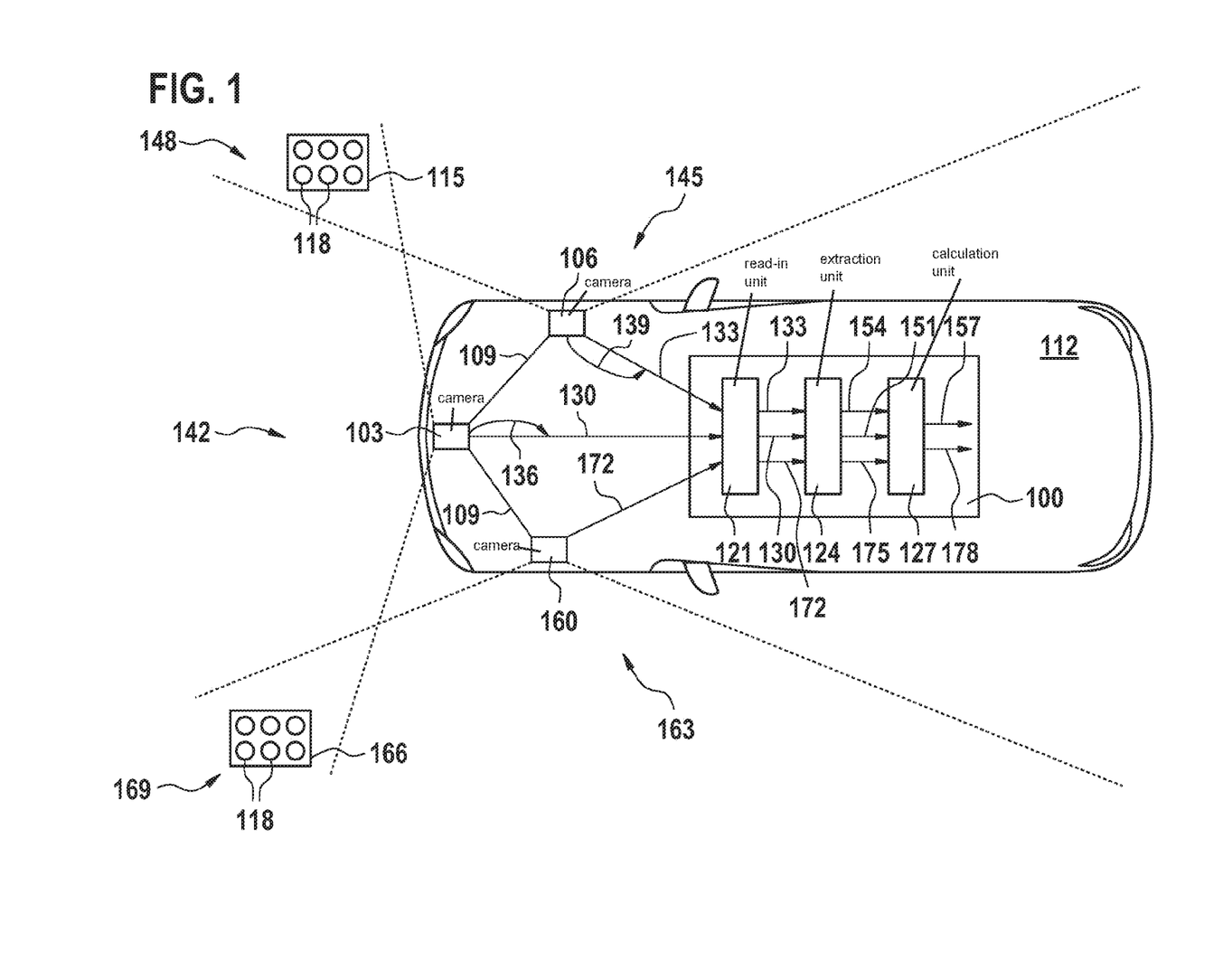
FIG. 1 schematically shows a view of a device for detecting an arrangement of at least two cameras of a multi-camera system of a mobile carrier platform with respect to one another according to one exemplary embodiment of the present invention.

FIG. 1 schematically shows a view of a device 100 for detecting an arrangement of at least two cameras 103, 106 of a multi-camera system 109 of a mobile carrier platform 112 with respect to one another according to one exemplary embodiment of the present invention. Device 100 in this case is situated on mobile carrier platform 112, mobile carrier platform 112 being a vehicle 112, for example. Multi-camera system 109 encompassing at least first 103 and second 106 camera, is situated on vehicle 112, first 103 and second 106 camera being wide-angle cameras, for example, having a field of view of 170 degrees. At least one marker 115, which has a two-dimensional marker pattern structure 118, is situated in the immediate surroundings of vehicle 112. Marker pattern structure 118 in this case is a pattern, for example, including six symmetrically arranged circles, which are arranged here in two rows.

Device 100 includes a read-in unit 121, an extraction unit 124 as well as a calculation unit 172. Read-in unit 121 is designed to read in at least first image signals 130 and second image signals 133, first image signals 130 representing images of marker pattern 118 and of a first camera parameter 136 from first camera 103 and second image signals 133 representing images of the same marker pattern 118 and of a second camera parameter 139 from second camera 106. Second camera 106 in this case is oriented in a viewing direction and position differing from first camera 106, viewing areas 142 and 145 of first 103 and second 106 camera at least partially overlapping, marker 115 carrying marker pattern 118 being read in as situated in a section 148 of viewing areas 142 and 145 of first 103 and second 106 camera. Extraction unit 124 is designed to extract a first arrangement parameter 151 of first camera 103 and/or a second arrangement parameter 154 of second camera 106 using read-in first 130 and second 133 image signals, first 151 and second 154 arrangement parameters representing a position and/or orientation of first 103 and second 106 camera in relation to marker 115. Finally, calculation unit 127 is designed to calculate a differential arrangement parameter 157 of second camera 106 in relation to first camera 103 using extracted first 151 and/or second 154 arrangement parameter, in order to obtain a relative camera position of second camera 106 in relation to first camera 103.

According to one exemplary embodiment of the present invention, vehicle 112 includes a third camera 160, third camera 160 being oriented in a viewing direction differing from first 130 and/or second 106 camera, viewing areas 142, 145 and 163 of first 103, second 106 and/or third 160 camera at least partially overlapping. According to one exemplary embodiment, a second marker 166 is further situated in the immediate surroundings of vehicle 112, first 115 and second 166 marker being situated on opposite sides of vehicle 112, second marker 166 being situated in a section 169 of viewing areas 142 and 163 of first 103 and third 160 camera. Both markers 118 and 166 have the same marker pattern structure 118.

Read-in unit 121 is further designed to read in at least third image signals 172 of third camera 160. Extraction unit 124 is further designed to extract a third arrangement parameter 175 of third camera 160 using read-in third image signals 172. Finally, calculation unit 127 is designed to calculate a differential arrangement parameter 178 of third camera 160 in relation to second 106 and/or to first camera 103 using extracted third arrangement parameter 175, in order to obtain a relative camera position of third 160 camera in relation to second 106 and/or to first 103 camera.

Figure 2:
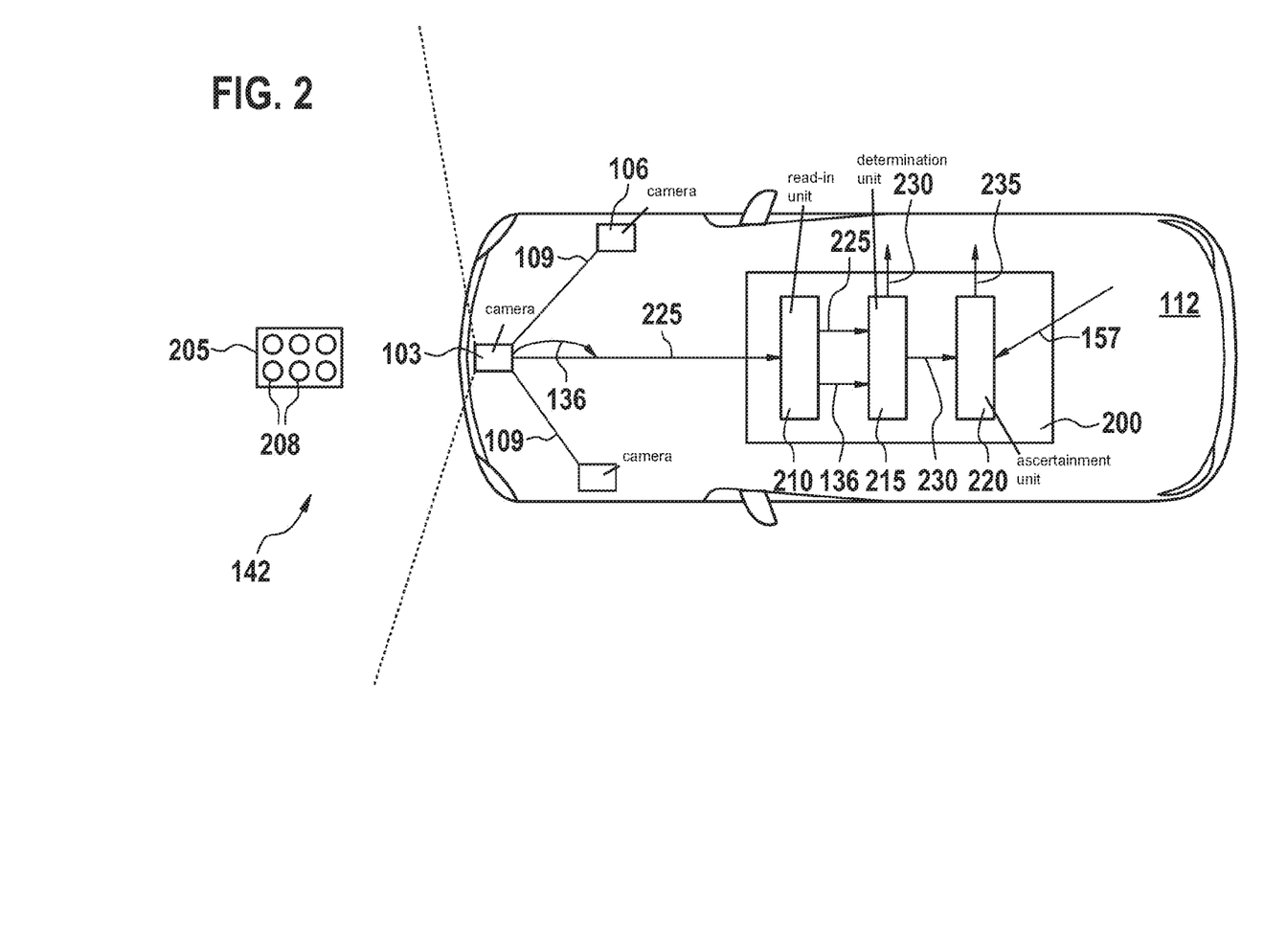
FIG. 2 schematically shows a view of a device for detecting an arrangement of a camera with respect to an object outside the mobile carrier platform according to one exemplary embodiment of the present invention.

FIG. 2 schematically shows a view of a device 200 for detecting an arrangement of camera 103 with respect to an object 205 outside mobile carrier platform 112 according to one exemplary embodiment of the present invention. Device 200 in this case is situated on mobile carrier platform 112, mobile carrier platform 112 being a vehicle 112, for example. According to one exemplary embodiment, camera 103, which is first camera 103 or a reference camera 103, is situated on vehicle 112. According to one exemplary embodiment, a second camera 106 is also situated on vehicle 112. At least one object 205 is situated in the immediate surroundings of vehicle 112, object 205 being an object marker 205 that has an object marker pattern structure 208. Object marker pattern structure 208 in this case corresponds to the marker pattern structure of the markers from FIG. 1, object marker pattern structure 208 mapping, for example, a pattern having six symmetrically arranged circles. Viewing area 142 of first camera 103 is represented by dotted lines, object marker 205 according to one exemplary embodiment being situated in immediate viewing area 142 of first camera 103.

Device 200 includes a read-in unit 210, a determination unit 215 as well as an ascertainment unit 220. Read-in unit 210 is designed to read in object image signals 225, object image signals 225 representing images of an object marker pattern 208 and a camera parameter 136 from first camera 103. Read-in unit 210 in this case is designed, in particular, to read in object image signals 225, in which an axis of object marker pattern 208 is oriented to a visual axis of first camera 103, which has a lower distortion than a further visual axis of another viewing area of first camera 103. Determination unit 215 is designed to determine an object arrangement parameter 230 of first camera 103 with respect to object marker 205 using read-in object image signals 225 and first camera parameter 136, object arrangement parameter 230 representing a position and/or orientation of first camera 103 in relation to object marker 205, in order to obtain a camera position of first camera 103 in relation to object marker 205. Finally, ascertainment unit 220 is designed to ascertain a further object arrangement parameter 235 of second camera 106 with respect to object marker 205 using differential arrangement parameter 157 and object arrangement parameter 230 of first camera 103 provided by the calculation unit of the device from FIG. 1 and read in from ascertainment unit 220, the further object arrangement parameter 235 representing a position and/or orientation of second camera 106 in relation to object marker 205, in order to obtain a camera position of second camera 106 in relation to object marker 105.

Figure 3:
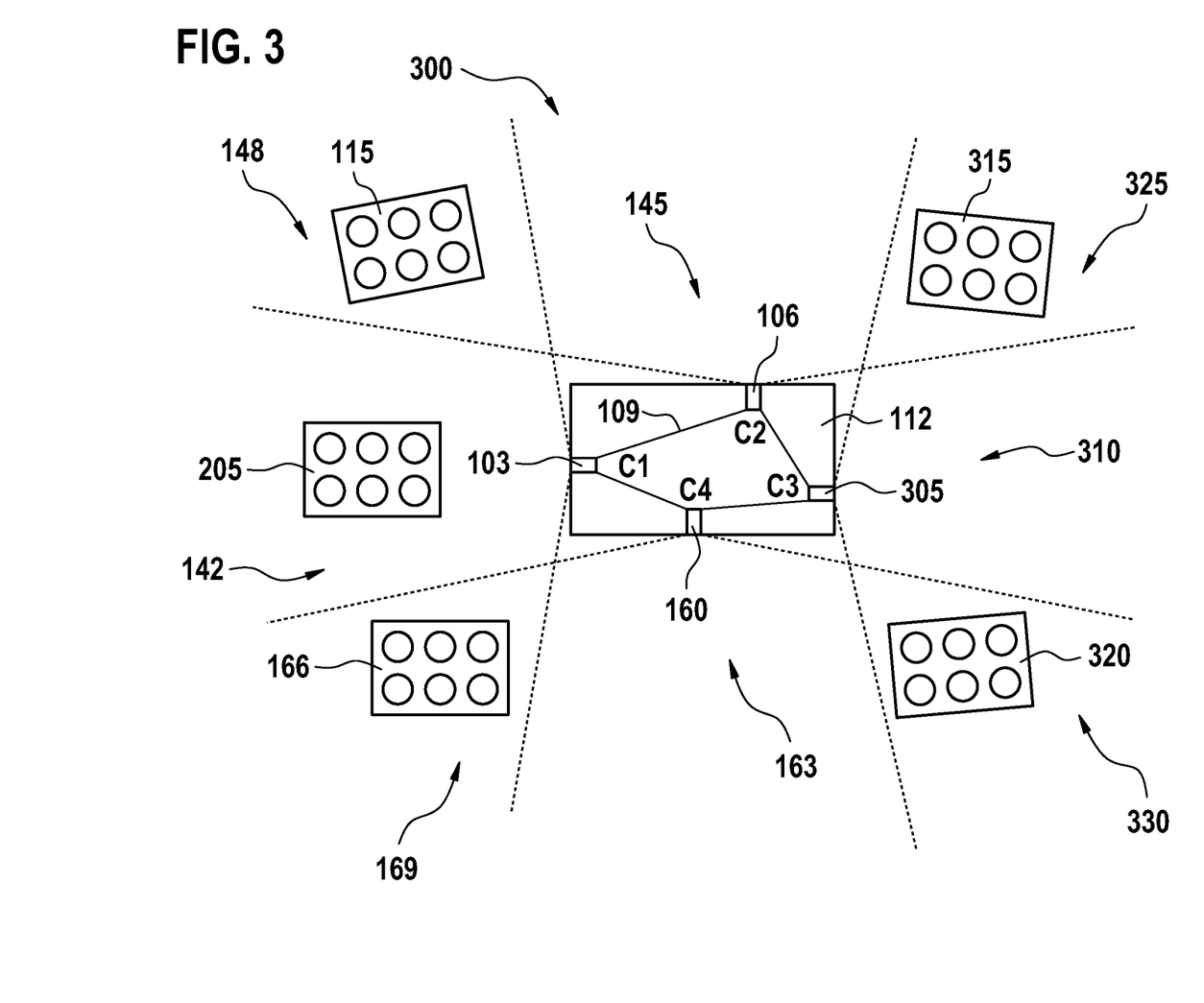
FIG. 3 schematically shows a system structure for using a method for detecting an arrangement of at least two cameras of a multi-camera system of a mobile carrier platform with respect to one another, as well as a method for detecting an arrangement of the camera with respect to an object outside the mobile carrier platform according to one exemplary embodiment of the present invention FIG. 4 schematically shows a system structure for using a method for detecting an arrangement of at least two cameras of a multi-camera system of a mobile carrier platform with respect to one another according to one exemplary embodiment of the present invention.

FIG. 3 schematically shows a system structure 300 for using a method for detecting an arrangement of at least two cameras 103, 106 of a multi-camera system 109 of a mobile carrier platform 112 with respect to one another, as well as a method for detecting an arrangement of camera 103 with respect to an object 205 outside the mobile carrier platform 112 according to one exemplary embodiment of the present invention.

Schematic system structure 300 includes a mobile carrier platform 112, the mobile carrier platform 112 depicted being a vehicle 112, for example. According to one exemplary embodiment, four cameras 103 (C1), 106 (C2), 160 (C4) and 305 (C3) are situated on vehicle 112, cameras 103, 106, 160 and 305 being, for example, wide-angle cameras of a multi-camera system 109, for example, of a surround view camera system, for vehicle 112. Viewing areas 142, 145, 163 and 310 of cameras 103, 106, 160 and 305 are represented by dotted lines. System structure 300 further includes five markers 115, 166, 205, 315 and 320, marker 205 being object marker 205, which is used to obtain a camera position of first camera 103 or of reference camera 103 in relation to itself. Markers 115, 166, 315 and 320 are situated so as to be each clearly visible in overlapping viewing areas 148, 169, 325 and 330 of respective adjacently situated cameras 103 and 106, 103 and 160, 106 and 305, as well as 160 and 305. There are no limitations as to the arrangement of markers 115, 166, 315 and 320 relative to each other or in relation to vehicle 112. This makes it simple and saves time in order to carry out the method approach presented herein, in particular, in the case of a large number of cameras, or in the case of time limitations and/or space limitations, for example, during production operation.

To carry out the method for detecting an arrangement of first camera 103 or reference camera 103 with respect to an object 205 outside mobile carrier platform 112, additional object 205 is situated in the immediate surroundings of vehicle 112 and utilized as object marker 205, in order to orient the reference point of multi-camera system 109 to a predefined and/or predefinable reference point of vehicle 112. In this case, the arrangement of additional object marker 205 is adapted in relation to vehicle 112. This makes the method useful, in particular, when a flexibility in the selection of the referenced point is desired, or when the reference point is unable to be determined in advance. Markers 115, 166, 315 and 320 are situated in overlapping areas 148, 169, 325 and 330 of viewing areas 142, 145, 163 and 310 of cameras 103, 106, 160, 305 and object marker 205 is situated in immediate viewing area 142 of reference camera 103, an axis of the object marker pattern being oriented to a visual axis of reference camera 103. If system structure 300 encompasses a multitude of cameras, a plurality of reference cameras may also be selected in order to minimize the cumulative error when passing through the camera-marker pattern-camera-marker pattern chain.

Figure 4:
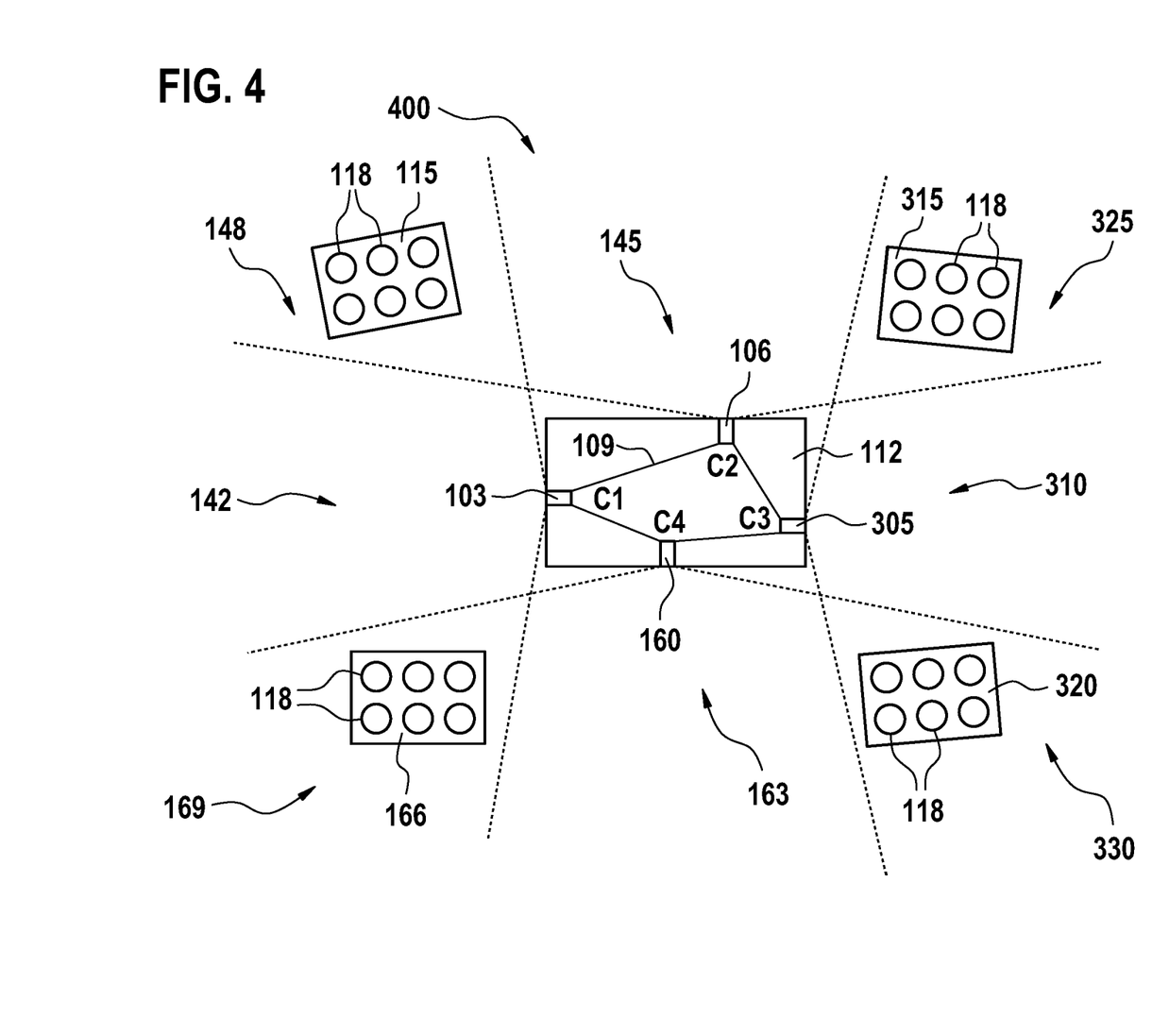

FIG. 4 schematically shows a system structure 400 for using a method for detecting an arrangement of at least two cameras 103, 106 of a multi-camera system 109 of a mobile carrier platform 112 with respect to one another according to one exemplary embodiment of the present invention. Mobile carrier platform 112 is a vehicle 112, for example. System structure 400 depicted here may be used with any multi-camera system 109 that is made up of at least two cameras 103, 106, multi-camera system 109 according to one exemplary embodiment encompassing four cameras 103, 106, 160 and 305. Viewing areas 142, 145, 163 and 310 of cameras 103, 106, 160 and 305 are represented by dotted lines. Cameras 103, 106, 160 and 305 are situated asymmetrically on vehicle 112, this asymmetrical arrangement not, however, being a requirement of the method approach presented herein. System structure 400 further includes four markers 115, 166, 315 and 320, markers 115, 166, 315 and 320 each being situated so as to be clearly visible in overlapping viewing areas 148, 169, 325 and 330 of the respective two adjacently situated cameras 103 and 106, 103 and 160, 106 and 305, as well as 160 and 305. There are no limitations as to the arrangement of markers 115, 166, 315 and 320 relative to one another or in relation to vehicle 112. Each marker 115, 166, 315 and 320 carries the same marker pattern 118, marker pattern 118 used here maps a group of six symmetrically arranged circles, a marker pattern to be used not being limited, however, to this one marker pattern 118. A general, two-dimensional marker pattern structure such as, for example, a checkerboard pattern, may also be used. A precondition for using a marker pattern structure is that the pieces of geometrical information of the marker pattern are known, as in this case the distances of the circle centers relative to one another.

System structure 400 includes no limitations with respect to the position and orientation of individual markers 115, 166, 315 and 320, as long as markers 115, 166, 315 and 320 are situated in the at least partially overlapping viewing areas 148, 169, 325 and 330 of cameras 103, 106, 160 and 305 and marker patterns 118 are clearly recognizable in the images. This makes it possible for markers 115, 166, 315 and 320 to be able to be situated around vehicle 112 arbitrarily and easily by a person who is not an expert. To maintain a high quality, each of markers 115, 166, 315 and 320 should be adapted in such a way that in each case it is located centrally in overlapping areas 148, 169, 325 and 330 of the respective camera images, where a distortion effect is minimal.

Since markers 115, 166, 315 and 320 are used in the method for detecting an arrangement of at least two cameras 103, 106 of a multi-camera system 109 of a mobile carrier platform 112 with respect to one another for estimating the difference in orientation of cameras 103, 106, 160 and 305 with respect to one another, the position and orientation of markers 115, 166, 315 and 320 themselves may also be individually adjusted in order to improve their visibility. Thus, markers 115, 166, 315 and 320 may, for example, be situated 45 degrees relative to the vehicle plane or at a height of 1 meter from the ground. The position and orientation of markers 115, 166, 315 and 320 would not change the position and orientation of cameras 103, 106, 160 and 305 with respect to one another as long as markers 115, 166, 315 and 320 are clearly visible and at least two cameras, for example 103 and 106, observe the same marker, for example 115, at the same position and orientation.

Figure 5:
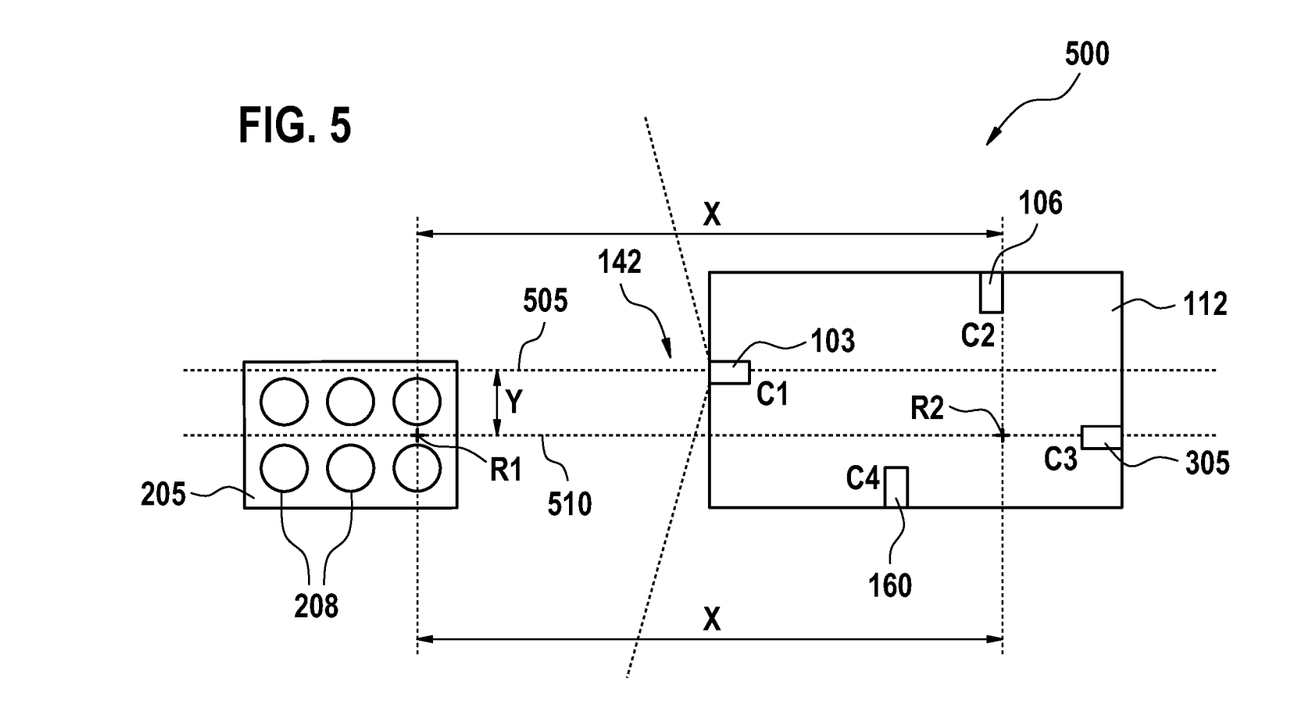
FIG. 5 schematically shows a system structure for using a method for detecting an arrangement of the camera with respect to an object outside the mobile carrier platform according to one exemplary embodiment of the present invention.

FIG. 5 schematically shows a system structure 500 for using a method for detecting an arrangement of camera 103 with respect to an object 205 outside mobile carrier platform 112 according to one exemplary embodiment of the present invention. Mobile carrier platform 112 is a vehicle 112, for example. System structure 500 depicted here may be used with any multi-camera system 109 that is made up of at least two cameras 103, 106, multi-camera system 109 depicted here encompassing four cameras 103, 106, 160 and 305 according to one exemplary embodiment. Camera 103 is referred to below as reference camera 103. Viewing area 142 of reference camera 103 is represented by dotted lines in FIG. 5.

To carry out the method for detecting an arrangement of first camera 103 or reference camera 103 with respect to object 205 outside mobile carrier platform 112, an additional object marker 205 situated in the immediate surroundings of vehicle 112 is utilized as an object 205, in order to orient a reference point of multi-camera system 109 to a reference point R2 of vehicle 112. In this case, the arrangement of additional object marker 205 is adapted in relation to vehicle 112, object marker 205 being situated in the immediate viewing area 142 of reference camera 103, an axis of object marker pattern 208 being oriented to a visual axis 505 of reference camera 103, which has a lower distortion than a further visual axis 510 of another viewing area of reference camera 103.

In carrying out the method, a reference point of multi-camera system 109 is moved from reference camera 103 to reference point R2 of vehicle 112 according to one exemplary embodiment. In order to orient reference point R2 of vehicle 112, a temporary object reference point R1 is used, object reference point R1 being situated on object marker 205. Object image data, which represent images of object marker pattern 208 recorded by reference camera 103, are processed in order to determine an offset or a shift between image patterns or an offset or a shift between reference points R1 and R2. The offset shift in X and Y between object reference point R1 and reference point R2 of vehicle 112 is then provided to the device for detecting an arrangement of camera 103 with respect to object 205 outside mobile carrier platform 112, in order to obtain the position of first camera 103 in relation to object marker 205. For this purpose, a change of orientation, i.e., a rolling, pitching and/or yawing between the object reference point R1 and reference point R2 of vehicle 112 is measured by reference camera 103. In order to simplify the above step, reference camera 103 may be situated along visual axis 510, which connects reference point R2 of vehicle 112 and object reference point R1, so that a determination of the Y-offset is omitted. The determination of a Z-offset may also be omitted if object reference point R1 and reference point R2 of vehicle 112 are situated along the same zero plane.

In this case, it should be mentioned that the object marker may be a marker having a marker pattern. Marker 115, used in a variant of the method presented herein for detecting an arrangement of at least two cameras such as, for example, of first camera 103 and of second camera 106 of the multi-camera system, may in particular, also be used in a variant of the method presented herein for detecting an arrangement of the camera with respect to an object outside mobile carrier platform as vehicle 112.

Such an approach may in this case provide the provision of a reference arrangement parameter between a first reference point R1 in a viewing area of first camera 103 and of a second reference point R2 and of the determination of the camera position of at least first camera 103 in relation to second reference point R2 using the provided reference arrangement parameters. First reference point R1 may be a color-coded or merely virtual point on or at an object such as object marker 205. First reference point R1 is preferably situated at a marker such as object marker 205 in a viewing area of first camera 103. First reference point R1 may, for example, be a point on a marker pattern of a marker or object marker 205. Second reference point R2 is situated preferably, for example, at or on or in mobile carrier platform 112. Second reference point R2 may, for example, be a point centered on or in the center of an axis 510, in particular, of a vehicle axis of mobile carrier platform 112. A reference arrangement parameter between first [reference point] R1 and second reference point R2 may be understood to mean a spatial orientation of reference points R1, R2 relative to one another, i.e., a relative position X, Y and a distance relative to one another, for example, in a coordinate system having the coordinate origin in second reference point R2. The provision of the reference arrangement parameter may provide an ascertainment of the spatial distance or of the relative orientation of reference points R1, R2 relative to one another using a suitable distance-detecting detection unit. The relative orientation of reference points R1, R2 is preferably ascertained with the aid of a rangefinder or a measuring tape. It is particularly preferred if reference points R1, R2, in particular first camera 103, are situated along an imaginary line 510. It is also advantageous if an axis of symmetry 510 of the marker or object marker 205 is oriented in parallel to an axis of symmetry 505 of mobile carrier platform 112. This simplifies the ascertainment of the relative orientation of reference points R1, R2 and the ascertainment of the camera position with respect to first reference point R1.

The determination of the camera position of at least first camera 103 in relation to second reference point R2 using the provided reference arrangement parameter corresponds to a coordinate change from a coordinate system having a coordinate origin at the position of first camera 103 to a coordinate system having a coordinate origin at the position of second reference point R2. A transformation or a change of the coordinate system to a coordinate system having an arbitrary predefinable coordinate origin is possible with the exemplary embodiment for such a method described herein.

As a result, an exact knowledge of the spatial positions of cameras 103, 106, 160, 305 at mobile carrier platform 112 is not necessary.

Figure 6:
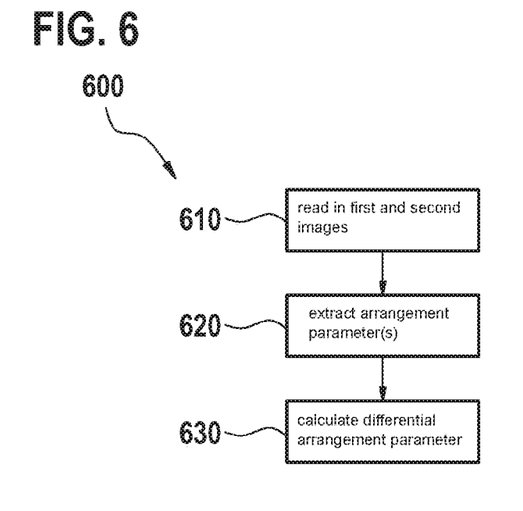
FIG. 6 shows a flowchart of one exemplary embodiment of a method for detecting an arrangement of at least two cameras of a multi-camera system of a mobile carrier platform with respect to one another according to one exemplary embodiment of the present invention.

FIG. 6 shows a flowchart of one exemplary embodiment of a method 600 for detecting an arrangement of at least two cameras of a multi-camera system of a mobile carrier platform with respect to one another according to one exemplary embodiment of the present invention. In this case, method 600 according to one exemplary embodiment of the present invention presented herein may be carried out on the device for detecting an arrangement of at least two cameras of a multi-camera system of a mobile carrier platform with respect to one another from FIG. 1.

In a step 610 of method 600, at least first and second image signals are read in, first image signals representing images of a marker pattern and of a first camera parameter from a first camera and the second image signals representing images of a marker pattern and of a second camera parameter from a second camera, the second camera being oriented in a viewing direction differing from the first camera, the viewing areas of the first and second camera at least partially overlapping, a marker carrying the marker pattern being read in as situated in a section of the viewing area of the first and second camera. In a subsequent step 620, a first arrangement parameter of the first camera is extracted using the read-in first image signal and/or a second arrangement parameter of the second camera is extracted using the read-in second image signal, the first arrangement parameter of the first camera and/or the second arrangement parameter of the second camera, in particular, being extracted using the read-in first and second image signals, the first and the second arrangement parameter representing a position and/or orientation of the first and second camera in relation to the marker. Finally, a differential arrangement parameter of the second camera in relation to the first camera is calculated in a step 630 of method 600 in order to obtain a relative camera position of the second camera in relation to the first camera.

Figure 7:
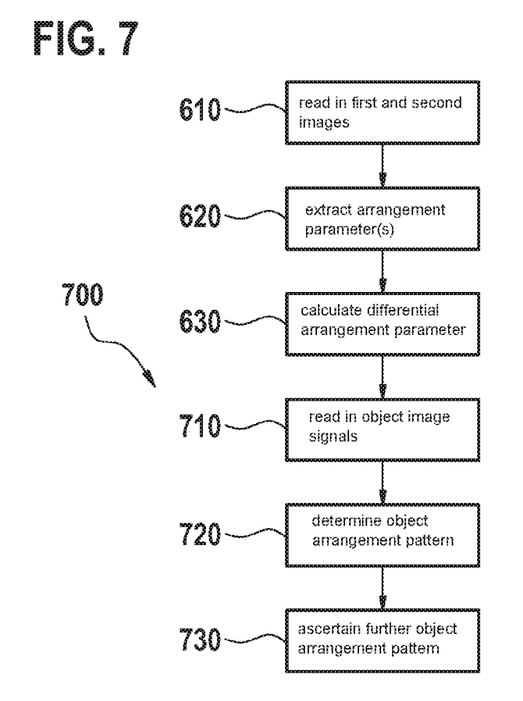
FIG. 7 shows a flow chart of one exemplary embodiment of a method for detecting an arrangement of the camera with respect to an object outside the mobile carrier platform according to one exemplary embodiment of the present invention.

FIG. 7 shows a flowchart of one exemplary embodiment of a method 700 for detecting an arrangement of the camera with respect to an object outside the mobile carrier platform according to one exemplary embodiment of the present invention. In this case, the method 700 according to one exemplary embodiment of the present invention presented herein may be carried out on the device for detecting an arrangement of the camera with respect to an object outside the mobile carrier platform from FIG. 2. The steps of method 600 for detecting an arrangement of at least two cameras of a multi-camera system of a mobile carrier platform with respect to one another from FIG. 6 may, for example, be carried out before method 700 is able to be carried out.

In a step 710 of method 700, object image signals are read in, the object image signals representing images of an object marker pattern and of a camera parameter from the first camera. In a subsequent step 720, an object arrangement pattern of the first camera with respect to the object marker is determined using the read-in object image signals and the first camera parameter, the object arrangement parameter representing a position and/or orientation of the first camera in relation to the object marker, in order to obtain a camera position of the first camera in relation to the object marker. Finally, a further object arrangement parameter of a second camera with respect to the object marker is ascertained in a step 730 of method 700 using a differential arrangement parameter as well as the object arrangement parameter of the first camera, the further object arrangement parameter representing a position and/or an orientation of the second camera in relation to the object marker, in order to obtain a camera position of the second camera in relation to the object marker.

If an exemplary embodiment of the present invention includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for detecting an arrangement of at least two cameras of a multi-camera system of a mobile carrier platform with respect to one another within a reference coordinate system, the method comprising the following steps:

reading in first image signals and second image signals, the first image signals representing at least one image of a first marker pattern and a first camera parameter from a first camera, and the second image signals representing at least one image of the first marker pattern and one second camera parameter from a second camera, the second camera being oriented in a viewing direction differing from the first camera, viewing areas of the first camera and the second camera at least partially overlapping, wherein a first marker carrying the first marker pattern being read in is situated in a section in which the viewing areas of the first camera and the second camera overlap;

extracting a first arrangement parameter of the first camera using the read-in first image signals and a second arrangement parameter of the second camera using the read-in second image signals, the first and the second arrangement parameters representing a position and/or orientation of the first camera and the second camera, respectively, in relation to the first marker;

calculating a differential arrangement parameter of the second camera in relation to the first camera using the extracted first arrangement parameter and the second arrangement parameter to obtain a relative camera position of the second camera in relation to the first camera;

providing a reference arrangement parameter between (a) a first reference point in the viewing area of the first camera and (b) a second reference point situated at, on, or in the mobile carrier platform; and determining a camera position of at least the first camera in relation to the second reference point using the provided reference arrangement parameter.

2. The method as recited in claim 1, wherein:

in the step of reading in, a third camera reads in at least third image signals, which represent at least one image of a marker pattern of a second marker and a third camera parameter, the third camera being oriented in a viewing direction differing from the first camera and/or the second camera, the viewing areas of the first and/or second and/or third camera at least partially overlapping;

the second marker is situated in a section of the viewing areas of the first camera and the third camera and/or of the second camera and the third camera;

in the step of extracting, a third arrangement parameter of the third camera is extracted using the third image signals; and in the step of calculating, differential arrangement parameters of the third camera in relation to the second camera and/or the first camera are calculated using the extracted third arrangement parameter to obtain a relative camera position of the third camera in relation to the second camera and/or the first camera.

3. The method as recited in claim 2, wherein in the step of reading in, the first marker and the second marker are read in on a same side or on adjacently situated sides or on opposite sides of the mobile carrier platform.

4. The method as recited in claim 1, wherein at least one of the first and second cameras is a wide-angle camera having a field of view of at least 130 degrees.

5. The method as recited in claim 4, wherein the field of view is at least 170 degrees.

6. The method as recited in claim 1, wherein the step of extracting takes place using a previously known marker pattern structure, the marker pattern structure mapping a checkerboard pattern and/or a pattern having arranged circles and/or a two-dimensional pattern.

7. The method as recited in claim 1, further comprising:
reading in object image signals that represent at least one image of an object marker pattern and the first camera parameter from the first camera; and
determining an object arrangement parameter of the first camera with respect to the object marker using the read-in object image signals and the first camera parameter, the object arrangement parameter representing a position and/or orientation of the first camera in relation to the object marker to obtain a camera position of the first camera in relation to the object marker.

8. The method as recited in claim 7, further comprising the following step:
ascertaining a further object arrangement parameter of the second camera with respect to the object marker using the differential arrangement parameter and the object arrangement parameter of the first camera, the further object arrangement parameter representing a position and/or orientation of the second camera in relation to the object marker to obtain a camera position of the second camera in relation to the object marker.

9. The method as recited in claim 1, wherein in the step of reading in the first and second image signals, a pattern that corresponds to the marker pattern of the first marker is also read in.

10. The method as recited in claim 7, wherein an axis of the object marker pattern is oriented to a visual axis of the first camera, which has a lower distortion than a further visual axis of another viewing area of the first camera.

11. A device comprising a processor, wherein, for detecting an arrangement of at least two cameras of a multi-camera system of a mobile carrier platform with respect to one another within a reference coordinate system, the processor is configured to:
read in first image signals and second image signals, the first image signals representing at least one image of a first marker pattern and a first camera parameter from a first camera, and the second image signals representing at least one image of the first marker pattern and one second camera parameter from a second camera, the second camera being oriented in a viewing direction differing from the first camera, viewing areas of the first camera and the second camera at least partially overlapping, wherein a first marker carrying the first marker pattern being read in is situated in a section in which the viewing areas of the first camera and the second camera overlap;
extract a first arrangement parameter of the first camera using the read-in first image signals and a second arrangement parameter of the second camera using the read-in second image signals, the first and the second arrangement parameters representing a position and/or orientation of the first camera and the second camera, respectively, in relation to the first marker;
calculate a differential arrangement parameter of the second camera in relation to the first camera using the extracted first arrangement parameter and the second arrangement parameter to obtain a relative camera position of the second camera in relation to the first camera;
providing a reference arrangement parameter between (a) a first reference point in the viewing area of the first camera and (b) a second reference point situated at, on, or in the mobile carrier platform; and
determining a camera position of at least the first camera in relation to the second reference point using the provided reference arrangement parameter.

12. A non-transitory machine-readable memory medium on which is stored a computer program for detecting an arrangement of at least two cameras of a multi-camera system of a mobile carrier platform with respect to one another within a reference coordinate system, the computer program, when executed by a computer, causing the computer to perform the following steps:
reading in first image signals and second image signals, the first image signals representing at least one image of a first marker pattern and a first camera parameter from a first camera, and the second image signals representing at least one image of the first marker pattern and one second camera parameter from a second camera, the second camera being oriented in a viewing direction differing from the first camera, viewing areas of the first camera and the second camera at least partially overlapping, wherein a first marker carrying the first marker pattern being read in is situated in a section in which the viewing areas of the first camera and the second camera overlap;
extracting a first arrangement parameter of the first camera using the read-in first image signals and a second arrangement parameter of the second camera using the read-in second image signals, the first and the second arrangement parameters representing a position and/or orientation of the first camera and the second camera, respectively, in relation to the first marker;
calculating a differential arrangement parameter of the second camera in relation to the first camera using the extracted first arrangement parameter and the second arrangement parameter to obtain a relative camera position of the second camera in relation to the first camera;
providing a reference arrangement parameter between (a) a first reference point in the viewing area of the first camera and (b) a second reference point situated at, on, or in the mobile carrier platform; and
determining a camera position of at least the first camera in relation to the second reference point using the provided reference arrangement parameter.

13. A method for detecting an arrangement of at least two cameras of a multi-camera system of a mobile carrier platform with respect to one another within a reference coordinate system, the method comprising the following steps:
reading in first image signals and second image signals, the first image signals representing at least one image of a first marker pattern and a first camera parameter from a first camera, and the second image signals representing at least one image of the first marker pattern and one second camera parameter from a second camera, the second camera being oriented in a viewing direction differing from the first camera, viewing areas of the first camera and the second camera at least partially overlapping, wherein a first marker carrying the first marker pattern being read in is situated in a section in which the viewing areas of the first camera and the second camera overlap;

extracting a first arrangement parameter of the first camera using the read-in first image signals and a second arrangement parameter of the second camera using the read-in second image signals, the first and the second arrangement parameters representing a position and/or orientation of the first camera and the second camera, respectively, in relation to the first marker;

calculating a differential arrangement parameter of the second camera in relation to the first camera using the extracted first arrangement parameter and the second arrangement parameter to obtain a relative camera position of the second camera in relation to the first camera;

reading in, from the first camera, third image signals representing an image of a second marker pattern carried on a second marker, wherein the second marker is situated in a section of the viewing area of the first camera (a) that is not within the viewing area of the second camera and (b) of which the first camera is able to sense with less distortion than the section in which the first marker is situated;

determining a position of the first camera relative to the second marker based on the third image signals in comparison to a predefined representation of the second marker pattern; and determining a position of the second camera relative to second marker or to the reference coordinate system of the second marker based on (a) the determined position of the first camera relative to the second marker and (b) the calculated differential parameter.

14. The method as recited in claim 13, wherein:

in the step of reading in, a third camera reads in at least fourth image signals, which represent at least one image of a marker pattern of a third marker and a third camera parameter, the third camera being oriented in a viewing direction differing from the first camera and/or the second camera, the viewing areas of the first and/or second and/or third camera at least partially overlapping;

the third marker is situated in a section of the viewing areas of the first camera and the third camera and/or of the second camera and the third camera;

in the step of extracting, a third arrangement parameter of the third camera is extracted using the fourth image signals; and in the step of calculating, differential arrangement parameters of the third camera in relation to the second camera and/or the first camera are calculated using the extracted third arrangement parameter to obtain a relative camera position of the third camera in relation to the second camera and/or the first camera.

15. The method as recited in claim 14, wherein in the step of reading in, the first marker and the third marker are read in on a same side or on adjacently situated sides or on opposite sides of the mobile carrier platform.

16. The method as recited in claim 13, wherein at least one of the first and second cameras is a wide-angle camera having a field of view of at least 130 degrees.

17. The method as recited in claim 16, wherein the field of view is at least 170 degrees.

18. The method as recited in claim 13, wherein the step of extracting takes place using a previously known marker pattern structure, the marker pattern structure mapping a checkerboard pattern and/or a pattern having arranged circles and/or a two-dimensional pattern.

19. The method as recited in claim 13, wherein in the step of reading in the first and second image signals, a pattern that corresponds to the marker pattern of the first marker is also read in.

20. The method as recited in claim 13, further comprising the following steps:

providing a reference arrangement parameter between (a) a first reference point on the second marker in the viewing area of the first camera and (b) a second reference point; and determining a camera position of at least the first camera in relation to the second reference point using the provided reference arrangement parameter.

* * * * *